(12) United States Patent
Sulwinski et al.

(10) Patent No.: US 12,038,118 B2
(45) Date of Patent: Jul. 16, 2024

(54) PIPELINE ISOLATION TOOL WITH SEAL HAVING ADAPTABLE MECHANICAL SUPPORT STRUCTURE

(71) Applicant: TDW Delaware, Inc., Wilmington, DE (US)

(72) Inventors: Rafal Sulwinski, Sandnes (NO); Khanh Van Nguyen, Sandnes (NO); Cody A. Parsley, Tulsa, OK (US); Kurt Steinsvik, Sandnes (NO)

(73) Assignee: TDW Delaware, Inc., Wilmington, DE (US)

( * ) Notice: Subject to any disclaimer, the term of this patent is extended or adjusted under 35 U.S.C. 154(b) by 0 days.

(21) Appl. No.: 18/157,194

(22) Filed: Jan. 20, 2023

(65) Prior Publication Data
US 2023/0228359 A1 Jul. 20, 2023

Related U.S. Application Data

(60) Provisional application No. 63/301,299, filed on Jan. 20, 2022.

(51) Int. Cl.
| | |
|---|---|
| *F16L 55/132* | (2006.01) |
| *F16J 15/02* | (2006.01) |
| *F16J 15/28* | (2006.01) |
| *F16L 55/128* | (2006.01) |

(52) U.S. Cl.
CPC ........... *F16L 55/132* (2013.01); *F16J 15/028* (2013.01); *F16L 55/1283* (2013.01)

(58) Field of Classification Search
CPC ..... F16L 55/132; F16L 55/1283; F16J 15/028
See application file for complete search history.

(56) References Cited

U.S. PATENT DOCUMENTS

| | | | |
|---|---|---|---|
| 10,094,479 B2 | 10/2018 | Odori | |
| 10,436,372 B2 | 10/2019 | Bjorsvik et al. | |
| 10,989,347 B2 | 4/2021 | McKone et al. | |
| 2006/0186602 A1* | 8/2006 | Martin | E21B 33/1212 |
| | | | 277/338 |

FOREIGN PATENT DOCUMENTS

| | | |
|---|---|---|
| CN | 105570601 A | 5/2016 |
| WO | 03067134 A2 | 8/2003 |
| WO | 2009058021 A2 | 5/2009 |

* cited by examiner

*Primary Examiner* — Gilbert Y Lee
(74) *Attorney, Agent, or Firm* — GableGotwals

(57) ABSTRACT

Pipeline isolation tool for sealing extrusion gaps of up to about 20% or greater includes a pair of fenced barriers (60, 160) having overlapping segments (68/70, 168/170) for restraining a seal (40). The segments expand to a pipe wall before the seal to prevent transition of seal medium over the segments and form a support wall for the seal. The support wall may include a protection ring (200). Springs (80, 180) surround each fenced barrier for returning the support system to a relaxed position. Inner rings (90, 190) are provided on sealing element facing surfaces (64, 164) of the fenced barrier for supporting the segments. The inner rings define a smooth inner guiding surface (92, 192) for the seal. The guiding surface is tilted inwardly towards the seal for resisting the sealing element during expansion and for preventing an inside diameter of the seal from expanding outwardly when compressed.

20 Claims, 18 Drawing Sheets

PIPELINE ISOLATION TOOL WITH SEAL HAVING ADAPTABLE MECHANICAL SUPPORT STRUCTURE

CROSS-REFERENCE TO CO-PENDING APPLICATIONS

This application claims priority to U.S. Provisional App. No. 63/301,299 filed Jan. 20, 2022.

FIELD OF THE DISCLOSURE

This disclosure is in the field of elastomer packer seals and setting systems used in pipeline isolation tools for establishing an activated and leak free seal.

BACKGROUND OF THE DISCLOSURE

Piggable or free-floating isolation tools are used for pipe inline services. These tools may include elastomer packer seals and are used for pipeline isolation of oil and gas or other pipeline products.

Elastomer packer seals generally have an elastomer core in the shape of a ring that is compressed to expand radially outward to the pipe from the tool or plug body to close the gap between the fixed outside diameter of the plug body and the inside diameter of the pipe. For purposes of this disclosure, this gap is referred to as the extrusion gap. Conventional seals use an adaptive or garter spring to close the clearance gap between the plug and the pipeline. However, openings exist between the spring coils. Portions of the elastomer core may protrude through these openings, with the resulting loss of elastomer challenging the integrity of the packer as pressure and/or temperature increase. This elastomer protrusion is called creep or elastomer creep.

Creep (and its resulting seal failure) can also happen as the seal is exposed to the cumulative effects of pressure and temperature. This is of particular concern in long isolations, where doubt exists over the garter springs and the possibility of rubber creeping through. In addition, the springs may become unstable and can fail to support the elastomer core, particularly when the extrusion gap is large and the isolation pressure is high. Further, manufacturing errors may not be possible to visually detect for "in-molded" springs.

There is a need for an adaptable mechanical support structure that can support and protect the elastomer core when in use in applications where there are large extrusion gaps between the plug and the pipe wall. There is also a need for an adaptable mechanical support structure that can withstand high forces generated by the isolation pressure. For purposes of this disclosure, a large extrusion gap means a gap requiring greater than 10% radial expansion of the elastomer core or sealing element between a relaxed and expanded state, that is, one where the ratio of pipeline inner diameter to tool outer diameter is greater than approximately 1.10 (e.g. 10% radial expansion). High isolation pressure means up to 102 bar or greater.

U.S. Pat. No. 10,436,372 to Bjørsvik, et al. for, "Large-gap-seal (LGS) assembly" discloses a large-gap-seal ("LGS") assembly and methods for its assembly and use. The LGS assembly has an elastomer core surrounded by adjoining structural segments. Non-adjoining gap segments are located on the sidewall surfaces of the elastomer core, with each gap segment approximately centered beneath the edges of two adjoining structural segments. The gap segments are exposed by the spaces that form between the structural segments when the LGS assembly is activated. Exposing the gap segments rather than the elastomer core protects the elastomer core from damage and preserves the integrity of the seal between the isolation tool and the inner wall of the pipeline.

U.S. Pat. No. 10,094,479 to Odori for "Device for Sealing Pipeline" discloses a plugging machine and a rigid tube provided with a stationary disc integral with the bottom of the tube and oriented almost orthogonal to the tube, with a movable disc paired with the stationary disc. A sealing ring of a resilient material is located between the discs and compressed when the movable disc is pressed against the stationary disc to adhere to an inner surface of the pipeline. The sealing ring is coaxial with respect to the pipeline. The movement of the movable disc is determined by raising or lowering a control rod within the tube by means of sloping sliders made in the lower portion of the rod which engage in respective grooves, likewise sloping, made in an axial shank associated with the movable disc and sliding inside an axial opening of the stationary disc. A component of a force is generated which is parallel to the axis of the discs. The axis is raised or lowered by rotation of a threaded ring engaging in a threading mate at the top of the rod.

U.S. Pat. No. 10,989,347 to McKone et al. for "Isolation Plug with Energized Seal" discloses an intrusive pipeline isolation tool and method of its use includes a plugging head having a seal for sealing engagement with a pipe wall; a fluid-activated cylinder located on one side of the seal and moveable in an axial direction; metal support segments located on another side of the seal and moveable in a transverse direction radially outward and inward; the metal segments including a concave portion, a portion of the seal residing within the concave portion when unset and set. When in a seal unset position a portion of the seal is covered by adjacent metal support segments of the plurality. When in a seal set position the portion of the seal is exposed between the adjacent metal support segments. The seal is self-energizing, its actuating force being in a same direction as a force from isolation pressure.

A need exists for a pipeline isolation tool that can span extrusion gaps to at least 20% greater than the fixed outside diameter of the tool and withstand high isolation pressures without experiencing seal creep.

SUMMARY

Embodiments of a pipeline isolation tool of this disclosure include a supporting system that consists of several segments that overlap one another other, e.g., a wedge shaped structural segment constructed of a thicker plate and a gap segment constructed of a thinner plate. The gap segments cover the gaps between the structural segments when those segments are expanded. The structural segments are guided and supported by an inner ring and an outer activation plate and are kept in place with a spring.

The pipeline isolation tool includes a sealing element that can consist of one elastomer element or several stacked elastomer plates that are bound or bonded together. A segmented and wedge-based supporting system is provided for enclosing the elastomeric seal for all pipe diameters within a predetermined setting range. The supporting system moves from a retracted or relaxed state to an extended or expanded state that provides a fenced barrier on each side of the seal when the seal is in its expanded state.

The elastomeric seal is activated by applying mechanical force to activation plates for compressing the seal in an axial direction. As a result of this applied force the support system will expand outwards to the pipe ID. The support system is made of metal plates shaped as segments having a certain or predetermined amount of overlap. This mechanism of segments will expand to the pipe wall before the seal does. The segments are linked to ensure a balanced, synchronous expansion.

Due to overlap between the structural segments, the support system forms a support wall when fully expanded along each lateral or radial face (ID portion) of the sealing element that serves as a support to the seal. Where the pipe ID is circular and no welds or deformities are encountered, the structural segments form a gap-free support wall. However, in applications where there may be a longitudinal pipe weld or the pipe may be oval shaped (at least in part), then some gaps could occur along the support wall when fully expanded. The support wall, therefore, may include a protection ring while isolating on a longitudinal pipe weld or if the pipe is expected to be oval shaped in order to provide a gap-free support wall.

When the structural segments are in contact with the pipe ID and the axially compressive force is continued, the sealing element expands outwardly towards the pipe and establishes sealing contact with the pipe and the segments prevent extrusion of seal material over the support system. The sealing element is guided by the support system during its expansion and is restrained from extruding when fully expanded and under differential pressure, one side of the seal being on the higher pressure side, the other side of the seal being on the lower pressure side.

The support system includes an inner ring located on either side of the seal for supporting the structural segments when expanded. The inner rings also have a second purpose. The inner rings have a guide surface having a profile that is tilted inwards at an angle towards the sealing element. The tilted shape is to establish a resistance to the sealing element when the sealing element expands and to prevent the ID of the sealing element from expanding outwardly when compressed. If the ID of the sealing element were to expand outwardly when compressed axially, the stress and strain levels in the seal would increase.

Retraction of the structural segments may be accomplished by way of a circular spring around the segments. The spring may be a polymer, elastomer, or mechanical spring. In some embodiments, nitrile butadiene rubber, hydrogenated nitrile butadiene rubber, or their equivalents may be used as the spring material. When the activation force and the differential pressure over the seal is removed, the two circular springs return the structural segments to a relaxed position. The sealing element is returned to a relaxed position based on its elasticity. In one embodiment, the sealing element is made of elastomer discs that are stacked and bonded with glue or other methods.

The supporting system consists of several segments that overlap one another. The design of the supporting system utilizes a wedge shaped structural segment made of thicker plate and a gap segment that is constructed of a thinner plate. The gap segments cover the gaps between the structural segments when expanded. The structural segments are guided and supported by the inner ring and an outer activation plate. The structural segments are kept in place with the spring. Inner rings are used to stabilize the structural segments during setting, pressurization and unsetting, as well as allow the elastomer seal to have a smooth guiding surface.

Embodiments of this disclosure may be used as a part of an intrusive or a non-intrusive isolation tool. Examples of such tools include, but are not limited to, TDW's PROS-TOPP™ and SMARTPLUG® PRO™ isolation tools. Embodiments of this disclosure may be arranged for use in other isolation tools where the application may require a large extrusion gap seal.

In embodiments, the seal can expand in the radial direction at least 20% from the tool hard OD and hold pressure to at least 102 bar at this expansion. In some embodiments, the seal can hold even higher pressures. In contrast, known current sealing technologies in the market designed for this pressure level can only expand approximately 12% at most. Embodiments of a seal of this disclosure can expand relative to the tool hard OD in a range of 0% (meaning the seal expands to the hard OD) to at least 20%, 4% to at least 20%, 10% to at least 20%, and can be used in applications where expansion is greater than 12%, there being sub-ranges within these broader ranges as well as discrete values.

The tool may include a protection ring to assist with forming a wall when the pipe includes longitudinal seams or is oval shaped (or has some other deformity) where the isolation is to occur. At least one undercut may be provided in the activation plates or pressure head cylinders—with or without protection ring—to increase strength (clamping force). A lower end of the support system resides in the undercut when in the fully relaxed state and can reside above the undercut when in the fully expanded state.

Because of the seal's increased expansion range, the seal of this disclosure allows for increased operations because the tool design can allow for a larger clearance to the pipe ID, which results in a more versatile tool. In other words, the hard OD of the tool can be smaller than that of prior art tools and therefore its clearance between the hard OD of the tool and the pipe ID can be greater than that of the prior art tools. Such a tool can be pigged through larger dents and restrictions than traditional tools. For intrusive isolations, the seal can pass thru smaller holes that may be drilled in the pipe and, thus, cover a larger range of pipe wall thicknesses with one tool.

Manufacturing of the seal is benefited by the simplicity of the seal design, which may be manufactured from sheets. This construction reduces fabrication costs and sourcing time for a seal. Additionally, no expensive mold is required to produce the seal. The simplicity of the method of manufacture allows rapid and cost effective seal production anywhere in the world.

In tests conducted by the inventors, a seal and support system of this disclosure was successfully tested in a 24-inch nominal pipe diameter at 153 bar and a 20% extrusion gap. The embodiments may be scaled to support even higher pressure and other pipe diameters up to 48-inch pipe.

In embodiments, a first and a second support system are provided on either side of the sealing element between the activation plates and the sealing element. The support systems utilize structural segments and gap segments for enclosing a respective side of the sealing element for all diameters of the pipe within a predetermined setting range. During expansion, the support systems contact the pipe wall prior to the sealing element contacting it. When in an expanded state, the circumferential outer surface of the sealing element forms a seal with an opposing wall of the pipe and the structural segments and gap segments provide a fenced barrier along a face of the seal between the inner ring of the support system and the seal OD.

The foregoing has outlined in broad terms the more important features of an isolation tool and seal disclosed herein so that the detailed description that follows may be more clearly understood, and so that the contribution of the inventors to the art may be better appreciated. Embodiments are not limited in their application to the details of the construction and to the arrangements of the components set forth in the following description or illustrated in the drawings. Other embodiments may be practiced and carried out in various other ways not specifically enumerated herein. Additionally, the disclosure that follows is intended to apply to all alternatives, modifications and equivalents as may be included within the spirit and the scope of the appended claims. Further, it should be understood that the phraseology and terminology employed herein are for the purpose of description and should not be regarded as limiting, unless the specification specifically limits it.

BRIEF DESCRIPTION OF THE DRAWINGS

FIG. 2 is a cross-sectional view of a fenced seal in a relaxed configuration, the geometric shape of the support system being different than that of FIG. 1 (symmetrical as opposed to asymmetrical in FIG. 1). An undercut in the activation plate may be provided to house a lower end of the support system. A protection ring may be added.

FIG. 9 is a cross-sectional view of another embodiment of a sealing element and support system that is unsymmetrical and includes a protection ring. The sealing element is shown in a relaxed state.

FIG. 12 is an embodiment of a tool of this disclosure that includes undercuts in one of the activation plates (i.e., in the OD of the activation cylinder wall). In a design without undercuts expansion may be in a range of 0% (meaning the seal is at or expands to the hard OD) to at least 20%, a design with undercuts may be limited at the lower end to 10% to at least 20%. The axial length of the undercut may be increased to further extend the lower end of the range.

Figure 1:
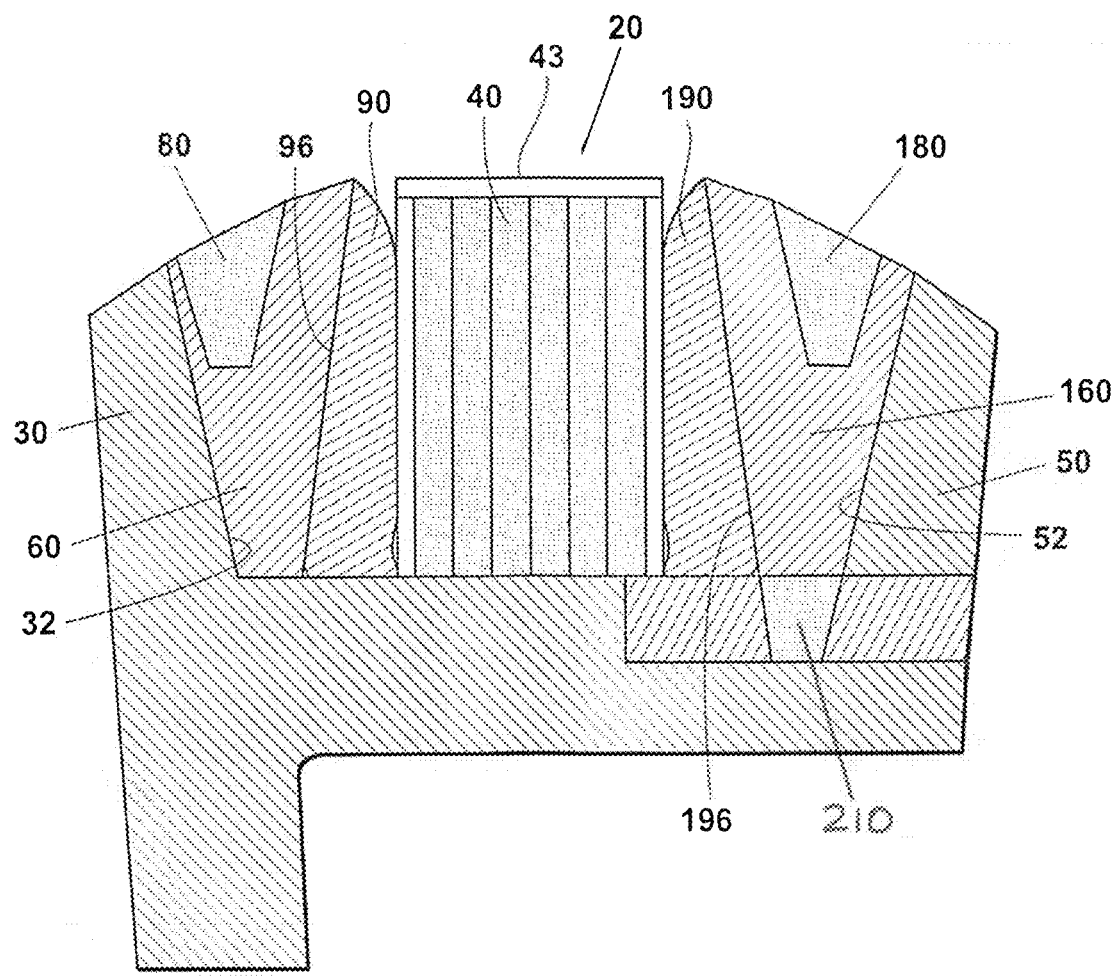
FIG. 1 is a cross-sectional view of an embodiment of a sealing element and support system of this disclosure. The sealing element is shown here in a relaxed configuration or state with the support system on each side of the seal. In a fully retracted state, the support systems are at their maximum (axial) distance from one another. The support system includes inner rings and structural and gap segments that provide a fenced barrier to the sealing element. The inner rings provide a guide surface for the sealing element that is titled or arranged at an angle to the sealing element. A protection ring may be added to either or both of the support systems. See e.g.

Elements and Numbering Used in the Drawings and Detailed Description
- 10 Pipe
- 12 Pipe wall
- 20 Pipeline isolation tool
- 22 Hard outer diameter
- 30 First activation plate or pressure head cylinder (higher pressure side)
- 32 Seal facing side
- 40 Sealing element
- 40A Stacked elastomer plates
- 41A Portion of seal side covered by inner ring
- 41B Portion of seal side covered by structural segment
- 41C Portion of seal side covered by gap segment
- 42 First side
- 43 Circumferential (outer, pipe-facing or sealing) side
- 44 Second side
- 45 Wrap
- 46 Inside diameter
- 48 Outer surface
- 49 Lower end
- 50 Second activation plate or pressure head cylinder (lower pressure side)
- 52 Seal facing side
- 60 First support system
- 62 Outside surface
- 64 First seal element facing surface
- 66 Spring groove
- 68 Structural segments
- 69 Lower end
- 70 Gap segments
- 80 First spring
- 90 First inner ring
- 91 Upper end (including convex or curved surface)
- 92 Inner guiding surface
- 96 Outer (support system facing) surface
- 98 Lower end
- 99 Concave portion
- 160 Second support system
- 162 Outside surface
- 164 First seal element facing surface
- 166 Spring groove
- 168 Structural segments
- 169 Lower end
- 170 Gap segments
- 180 Second spring
- 190 Second inner ring
- 191 Upper end (including convex or curved surface)
- 192 Inner guiding surface
- 194 Protection ring groove
- 195 Convex or curved portion
- 196 Outer (support system facing) surface
- 198 Lower end
- 199 Concave portion
- 200 Protection ring
- 210 Undercut (in OD of the activation cylinder wall)

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processes and manufacturing techniques are omitted so as to not unnecessarily obscure the description or the embodiments. The examples used are intended merely to facilitate an understanding of ways in which the embodiments of this disclosure may be practiced and to further enable those of skill in the art to practice the embodiments. Accordingly, the examples should not be construed as limiting the scope of the claimed invention.

Terms of approximation (e.g., "about", "substantially", "approximately") should be interpreted according to their ordinary and customary meanings as used in the associated art unless indicated otherwise. Absent a specific definition and absent ordinary and customary usage in the associated art, such terms should be interpreted to be ±10% of the base value (e.g. about 10% means 10%±1%). When ranges are given, those ranges include subranges within it as well as discrete values. Exact dimensions are nominal or target values which, in practice, may vary due to manufacturing or production tolerances as are experienced in the associated art.

Referring to the drawing figures, embodiments of a pipeline isolation tool 20 of this disclosure are adapted for insertion into a pipe 10, the pipe defining a pipe wall 12 having an ID, the pipeline isolation tool 10 having a fixed outer diameter 22. The tool 20 may be piggable and include pigging and gripping elements of a kind known in the art or may be part of a pigging train of a kind known in the art such as, but not limited to, a SMARTPLUG® isolation tool or a SMARTPLUG® isolation system.

Isolation tool 20 includes a sealing element 40 having a first side 42, a second side 44, and an outer circumferential side 43 located between the first and second sides 42, 44. The sealing element 40 has a smaller diameter when in a fully relaxed state and a larger diameter when in a sealing state or when in a fully expanded state, the fully expanded state being radially outward of the fixed outer diameter 22. The fully relaxed state may have a diameter less than that of the fixed outer diameter 22.

For purposes of this disclosure, the sealing state may be less than a fully expanded state because the sealing state may be limited by the pipe wall 12. In other words, the tool 20 may be capable of expanding the sealing element 40 to a greater sealing OD than that required by a specific isolation application because of the pipe ID. By way of a non-limiting example, the application may present a 13% extrusion gap—that is, the clearance between the fixed hard OD of tool 20 and the pipe wall 12—but the tool 20 could be capable of sealing at least a 20% extrusion gap. In other words, a diameter of sealing element 40 when in sealed state may be less than that in its fully expanded state. There are also intermediate diameters of the sealing element 40 between the fully retracted and fully expanded states and between a non-sealing and sealing state when in a pipeline.

To expand the sealing element 40 by compressing it in an axial direction, an activation plate 30, 50 is located opposite a corresponding one of the first and second sides 42, 44 of the sealing element 40. At least one activation plate 30, 50 of the pair is moveable in the axial direction toward the sealing element 40 during activation as well as away from it during retraction, such as when the activation force is removed or when differential pressure over the sealing element 40 is removed.

A fenced barrier or support system 60, 160 for the sealing element 40 is located between a corresponding one of the pair of activation plates 30, 50 and the first and second sides 42, 44 of the sealing element 40. The support system 60, 160 is arranged for axial and radial movement between a fully relaxed (retracted) state and a fully expanded (extended) state. The fully expanded state of the support system 60, 160 is outward of the fixed outer diameter 22. Each support system 60, 160 includes a groove 66, 166, a spring 80, 180 located in a corresponding one of the grooves 66, 166, a plurality of structural segments 68, 168, a plurality of gap segments 70, 170, and an inner ring 90, 190.

In embodiments, the structural segments 68, 168 are wedge shaped. A spacing between adjacent structural segments 68, 168 of the plurality of structural segments is smaller when the support system 60, 160 is in the fully relaxed state and larger when the support system 60, 160 is in a fully expanded state. Each corresponding gap segment 70, 170 of the plurality of gap segments is sized to span at least the larger spacing.

The inner ring 90, 190 includes a guide surface 92, 192 arranged opposite of, at an oblique angle relative to, and in contact with a corresponding one of the first and second sides 42, 44 of the sealing element 40. The inner ring 90, 190 covers one portion 41A of the corresponding one of the first and second sides 42, 44, the plurality of structural segments covers another portion 41B, and the plurality of gap segments covering yet another portion 41C when the sealing element 40 is in its expanded state. The support system 60, 160 and the sealing element 40 are arranged so that the fully expanded state of the support system 60, 160 occurs prior to the fully expanded state of the sealing element 40.

In embodiments, one or both support systems 60, 160 may include a groove 194 for receiving a protection ring 200 to assist with forming a wall when the pipe includes longitudinal seams or is oval shaped (or has some other deformity) where the isolation is to occur. At least one undercut 210 may be provided in one or both of the activation plates 30, 50—with or without protection ring 200—to increase the clamp support between inner rings 90, 190 and activation plate 30 or 50. A lower end 69, 169 of the support system resides in the undercut 210 when in the fully relaxed state and can reside above the undercut 210 when in the fully expanded state.

The undercut 210 can reduce the sealing range of isolation tool 20. A tool 20 of this disclosure can operate from 0% to at least a 20% extrusion gap in a configuration without undercuts 210. For a design with undercuts 210, in some embodiments the range is from 4% to at least a 20% extrusion gap, in other embodiments the range is 10% to at least a 20% extrusion gap, and in yet other embodiments the lower end of this range may be 1%, 2%, 3%, etc., on up to 9% (e.g. 2% to at least 20% extrusion gap). The undercut 210 affects the extrusion gap range due to the way the forces are transferred between various components. In order for the sealing element 40 to be energized, the compressive forces need to go through the seal/rubber. To increase the setting range, a hybrid undercut 210 may be used that provides more space in the axial direction.

Embodiments of a method of this disclosure prevent or mitigate the risk of seal creep of a sealing element 40 of a pipeline isolation tool when the sealing element 40 is spanning an extrusion gap in a range of 0% to at least 20% greater than the fixed outer diameter 22 of the pipeline isolation tool 20. The method includes actuating at least one activation plate 30, 50 of a pair of activation plates in an axial direction toward the sealing element 40, each plate 30, 50 of the pair located opposite a corresponding one of the first and second sides 42, 44 of the sealing element 40. In response to the actuating, moving a pair of support systems 60, 160 between a fully relaxed state and a fully expanded state, each support system 60, 160 located between a corresponding one of the pair of activation plates 30, 50 and the first and second sides 42, 44 of the sealing element 40, the sealing element 40 moving in response between the fully relaxed state and the fully expanded state. One or both of the support systems 60, 160 reach their fully expanded state prior to that of the sealing element 40.

Figure 2:
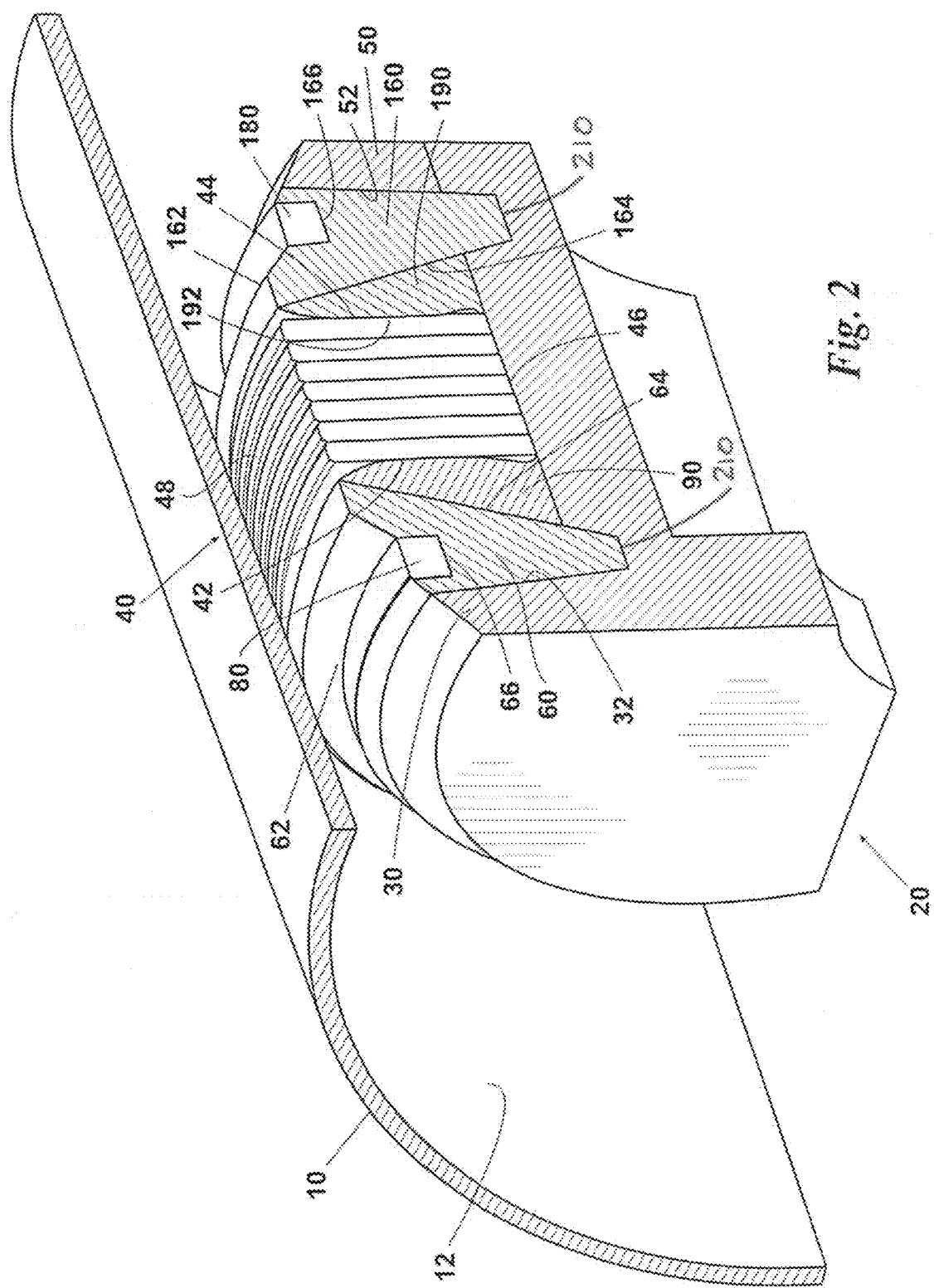
FIGS. 2 and 12.
Figure 3:
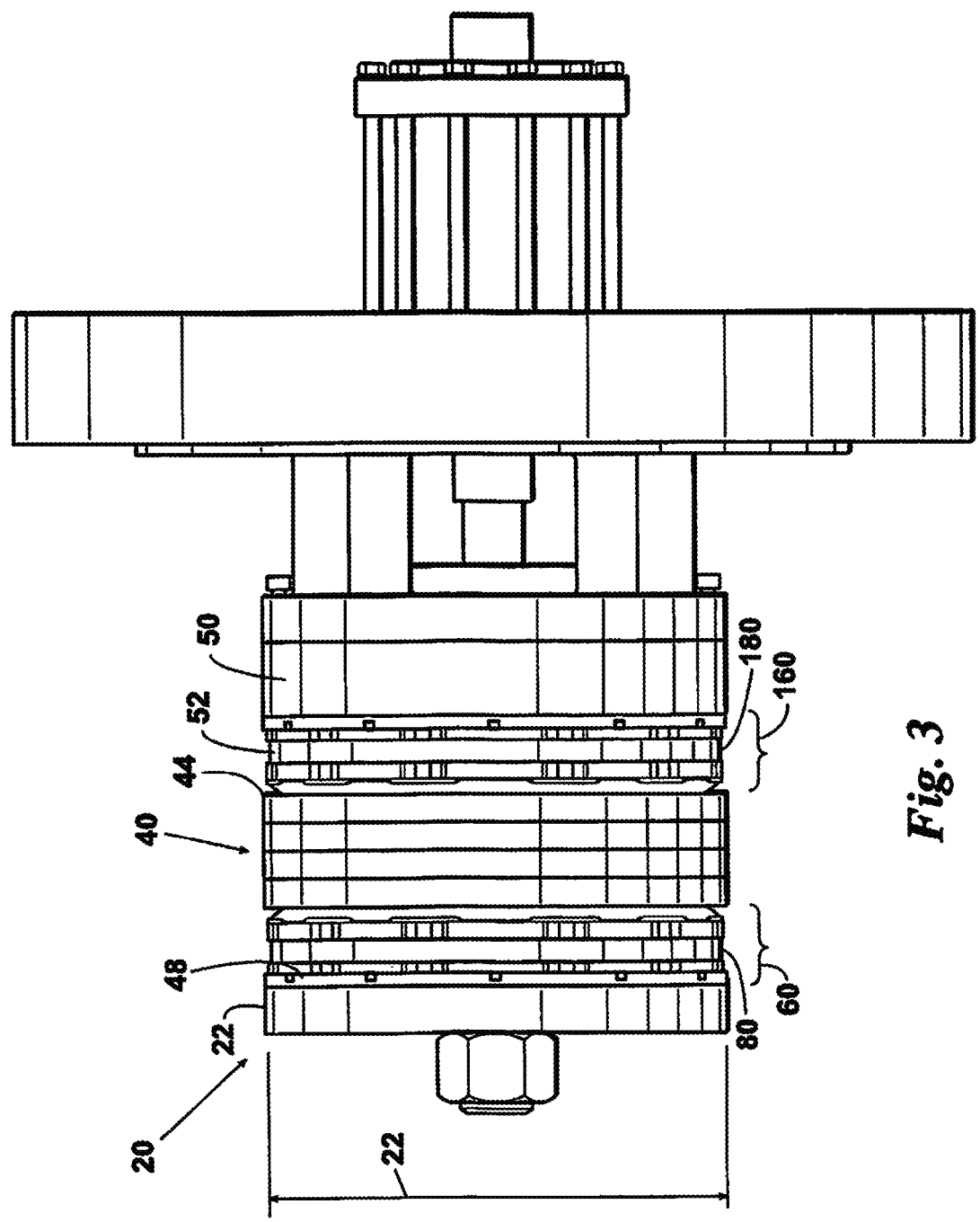
FIG. 3 is an elevation view of a pipeline isolation tool of this disclosure. The sealing element is located between two support systems that provide a fenced barrier to the seal. The fenced barrier supports the sealing to prevent extrusion of the sealing elements in addition to provide a guiding surface during seal expansion.
Figure 4A:
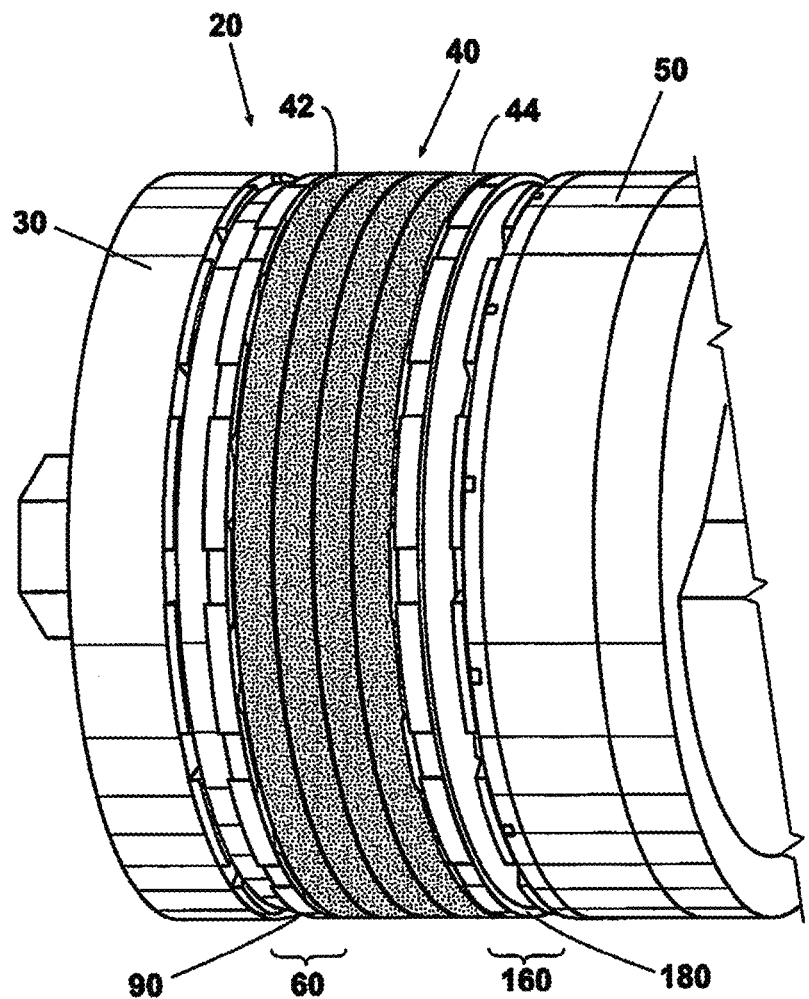
FIG. 4A is a perspective view of the sealing element and support systems of the pipeline isolation tool of FIG. 3, with the sealing element shown in the relaxed state.
Figure 4B:
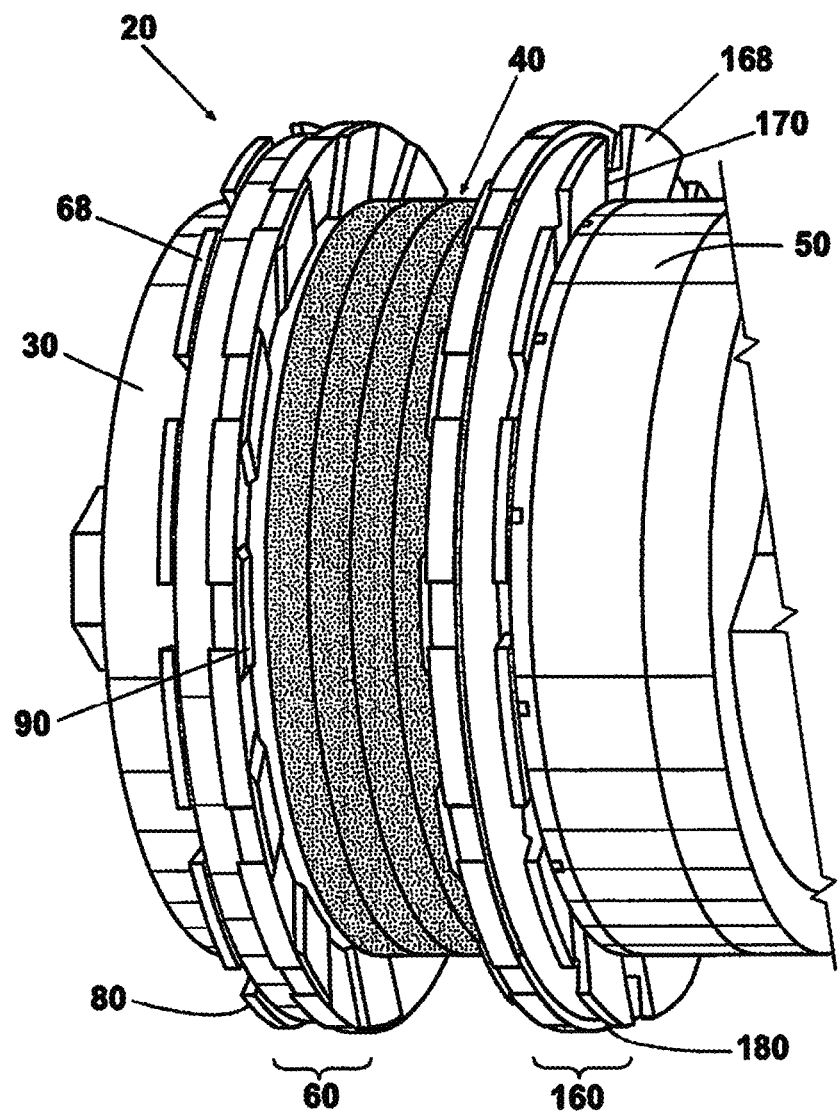
FIG. 4B is a perspective view of the sealing element and support systems of FIG. 3 wherein only the structural elements have expanded to contact the ID of the pipe wall.
Figure 4C:
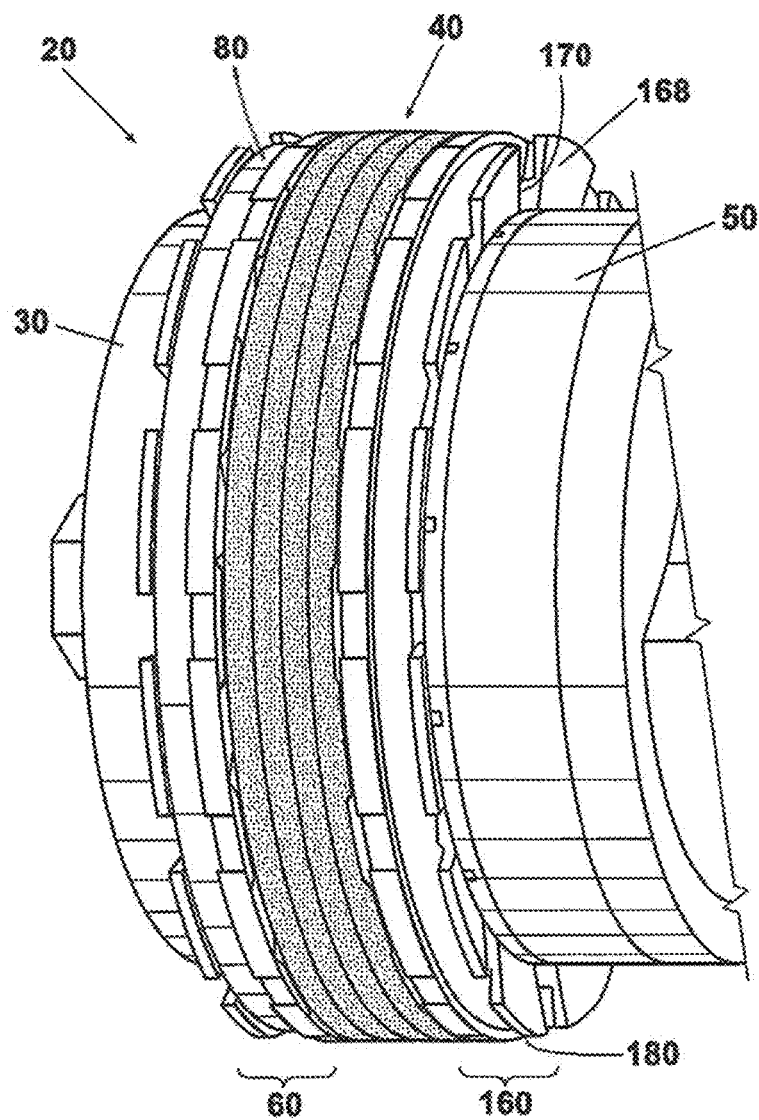
FIG. 4C is a perspective view of the sealing element and support systems of FIG. 3 wherein the structural elements and the sealing element have fully expanded to contact the ID of the pipe wall.
Figure 5:
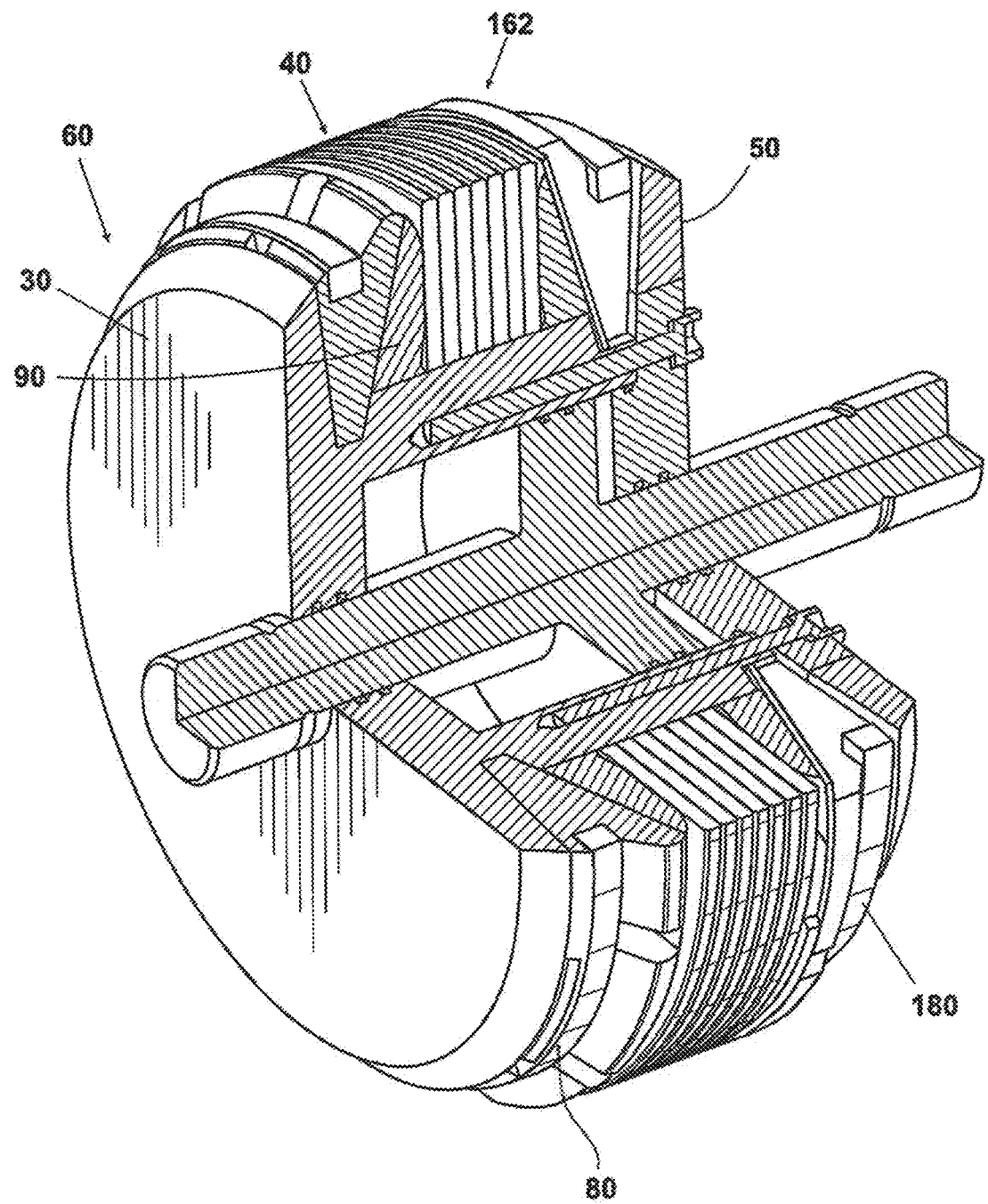
FIG. 5 is a partial cut-away perspective view of an embodiment of the sealing element and support systems.

Embodiments of a pipeline isolation tool 20 of this disclosure includes a hard (fixed) outer diameter 22 at its forward end and a "fenced packer" comprising a sealing element 40 located between two barriers or support systems 60, 160 each arranged opposite a corresponding one of the activation plates 30, 50. One or both of the activation plates 30, 50 may be connected to an activation system. In some embodiments, the activation system may be hydraulic-actuated and include a piston and rod arrangement (not shown). Each support system 60, 160 is wedged between a corresponding one of the plates 30, 50 and an inner ring 90, 190. As the piston is actuated and its rod extended, the axial distance between the plates 30, 50 decreases, the support systems 60, 160 move toward one another as well as radially outward toward the pipe wall 12, thereby compressing sealing element 40 and placing it in sealing engagement with the pipe wall 12 inner diameter. In embodiments, the support systems 60, 160 are wedge-shaped in cross-section, the corresponding mating surfaces 32, 52 of the activation plates 30, 50 and surfaces 96, 196 of inner rings 90, 190 forming a complementary wedge shape containing the support system 60, 160 (see e.g., FIGS. 1, 2 & 9).

In some embodiments, one activation plate 30 or 50 is fixed and the other activation plate 50 or 30 is connected to an activation system—like a piston rod of a hydraulic cylinder, a linear actuator, or other suitable actuation means, therefore, moveable toward and away from the plate 30 or 50. In other embodiments, both activation plates 30, 50 are affixed to the activation system. In embodiments using a double piston rod arrangement, the two piston rods may be linked for facilitating balanced synchronous movement.

Sealing element 40 is activated by applying mechanical force to at least one of first activation plate 30 and second activation plate 50 for compressing sealing element 40 in an axial direction and for expanding sealing element 40 radially outward to the inside diameter of pipe wall 12 of pipe 10. In embodiments, sealing element 40 can be adapted to at least 20% relative to the hard outer diameter 22 of pipeline isolation tool 20. Sealing element 40 can be further adapted to hold pressure in a predetermined range. In some embodiments, the predetermined range includes pressures up to about 102 bar. In other embodiments, the predetermined range includes pressures of at least 102 bar and greater, including but not limited to at least 153 bar.

Figure 6:
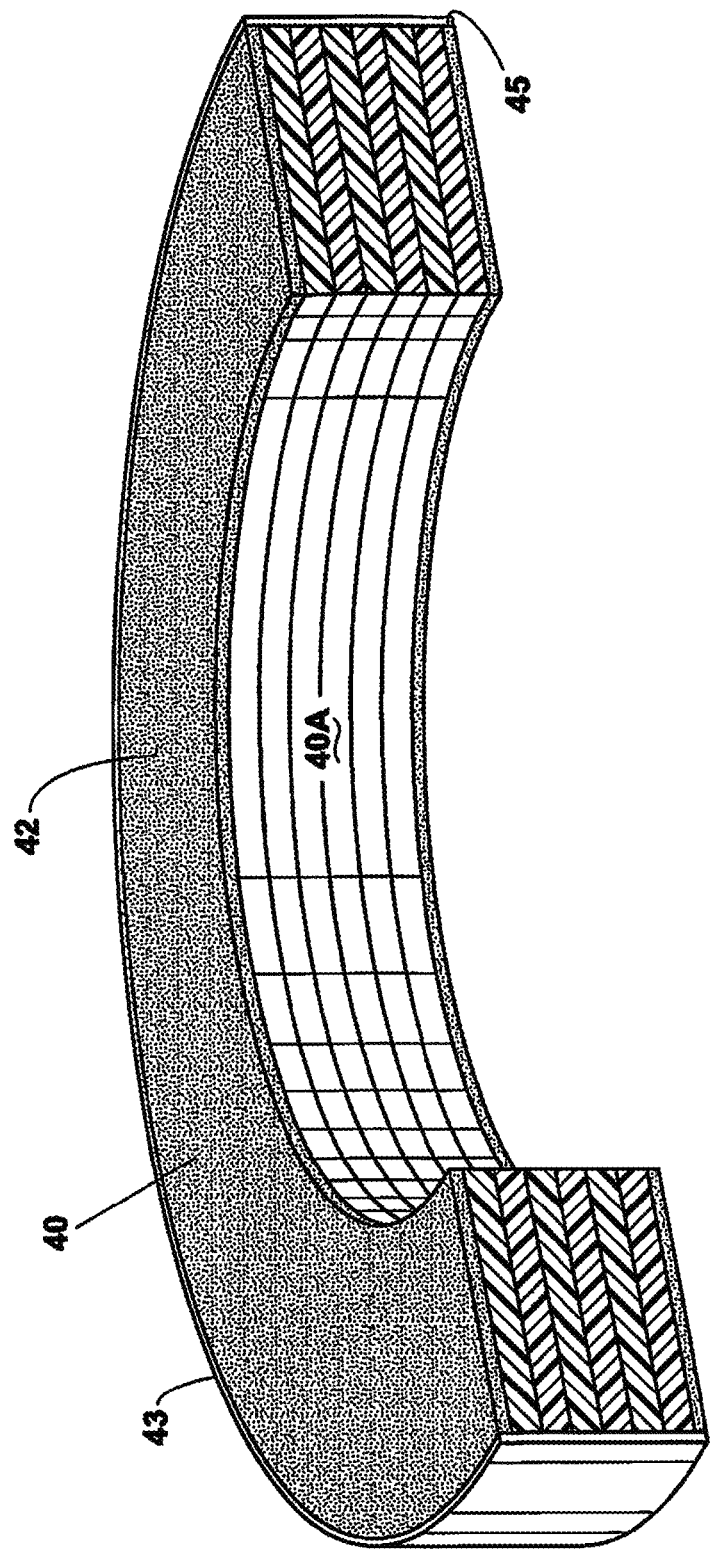
FIG. 6 is a cross section of one embodiment of the sealing element. The sealing element is comprised of stack plates and may be wrapped with an embedded fiber to provide strength in the axial and radial directions (the directions where seal extrusion may happen).

Sealing element 40 includes a first side 42 opposite a seal-facing side 32 of activation plate 30, a second side 44 opposite a seal-facing side 52 of activation plate 50, an inside diameter 46, and an outer surface 48. In some embodiments, sealing element 40 has a single or double elastomer element. In other embodiments, sealing element 40 includes a plurality of stacked elastomer plates 40A that are bound together (see, e.g., FIG. 6). Sealing element 40 may be wrapped in a rubber having a harder (higher) shore durometer, e.g., a shore durometer of 65, wherein an inner portion has a softer (lower) shore durometer, e.g., a shore durometer of 35. The inner softer material facilitates a lower activation pressure. The relatively harder exterior prevents extrusion of sealing element 40. In another embodiment, sealing element 40 includes a wrap 45. Wrap 45 may be a harder durometer rubber of may be include an embedded fiber to provide strength in the axial direction, the radial direction, or in both the axial and radial directions (the directions where seal extrusion may happen).

One support system 60 is located between first activation plate 30 and sealing element 40. Another support system 160 is located between the second activation plate 50 and the sealing element 40. One support system 60 is located on the higher pressure side of tool 20; the other support system 160 is located on the lower pressure side. For ease of description and to eliminate redundancy, support system 60 is described in detail below. The description of support system 160 would be the same as this, the difference being in the element numbering. The element numbering for the second support system 160 is in the hundreds rather than the tens (e.g. 168 instead of 68, 190 instead of 90).

Support system 60 includes structural segments 68, gap segments 70, and an inner ring 90. The structural segments 68 overlap the gap segments 70, each gap segments 70 being spaced from its adjacent gap segments 70 and lying below adjacent structural segments 68 (which may be touching one another when the sealing element 40 is in its relaxed state). As the axial distance between support systems 60 and 190 decrease, each expands radially outward toward the pipe wall. As each expand, the space between adjacent structural elements 68 increase, exposing more of the underlying gap segment 70. Together with the inner ring 90, the expanded structural segments 68 and the gap segments 70 form a support wall along the ID or side 42 (or 44) of the seal element 40 The inner ring 90 and segments 68, 70 are of a predetermined size to enclose a corresponding side 42, 44 of sealing element 40 for all diameters of pipe 10 within a predetermined setting range.

Figure 10:
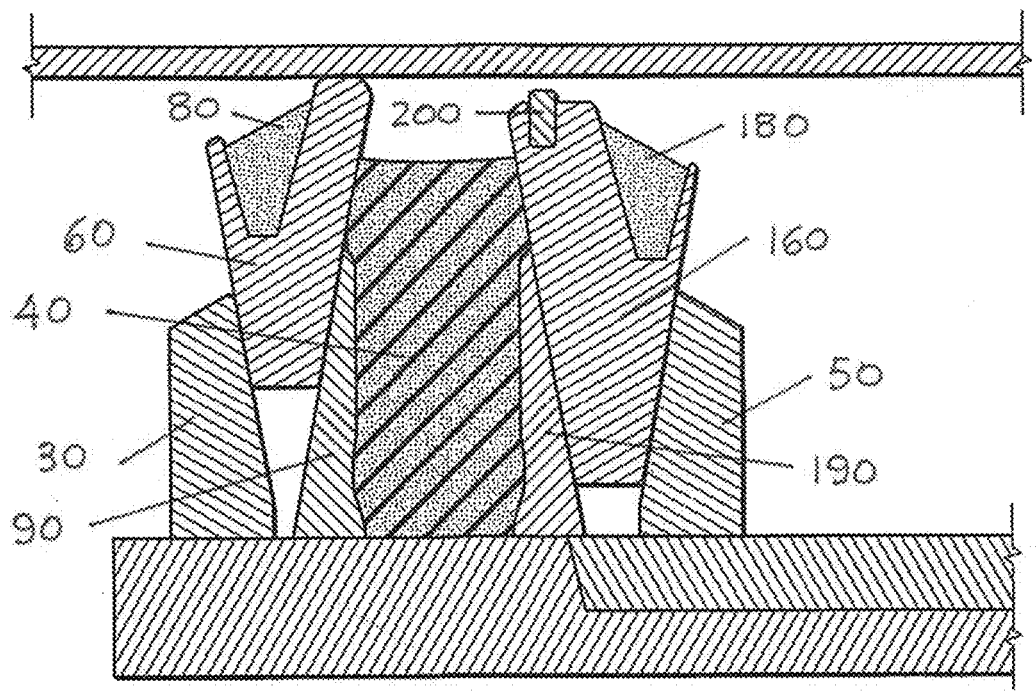
FIG. 10 is a schematic illustrating the sealing element of FIG. 9 when moving into a sealing or expanded state (but not yet fully expanded or in final sealing position). The support system on the forward or higher pressure side contacts the pipe wall first, followed by the support system on the rearward or lower pressure side.
Figure 11:
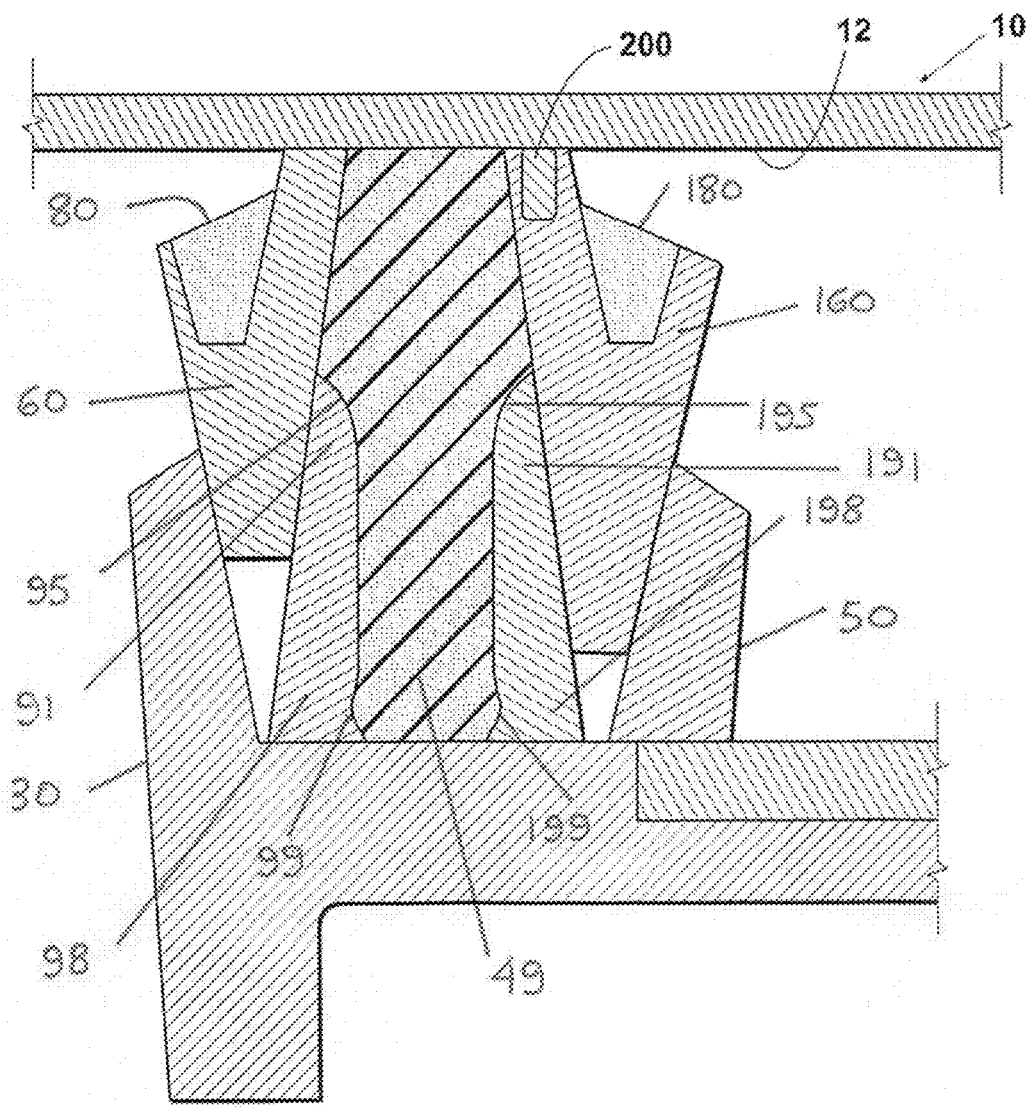
FIG. 11 is a schematic illustrating the sealing element of FIG. 9 when in a fully expanded state, the sealing element and protection ring both being in contact with the pipe ID.
Figure 12:
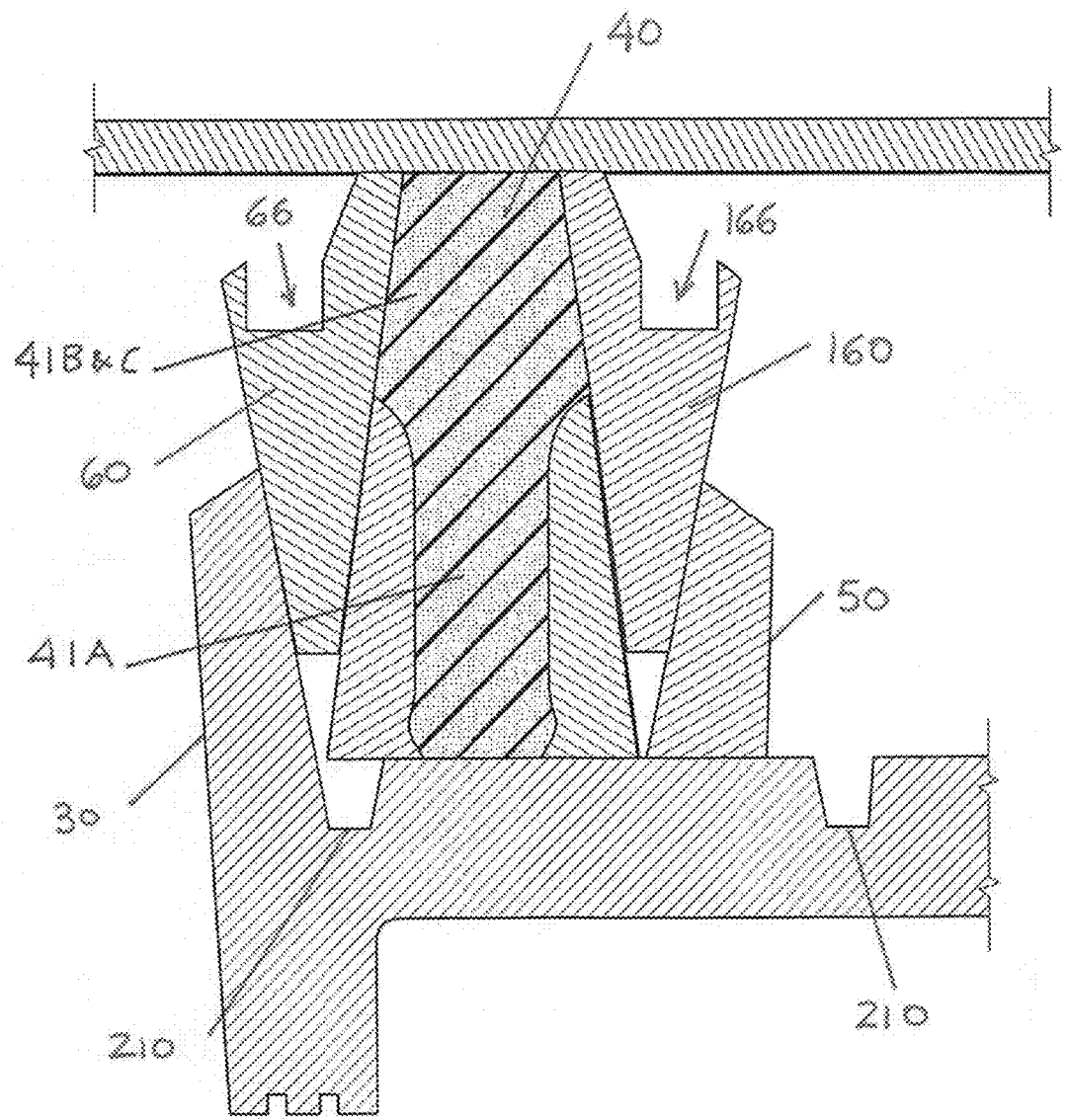
Figure 13A:
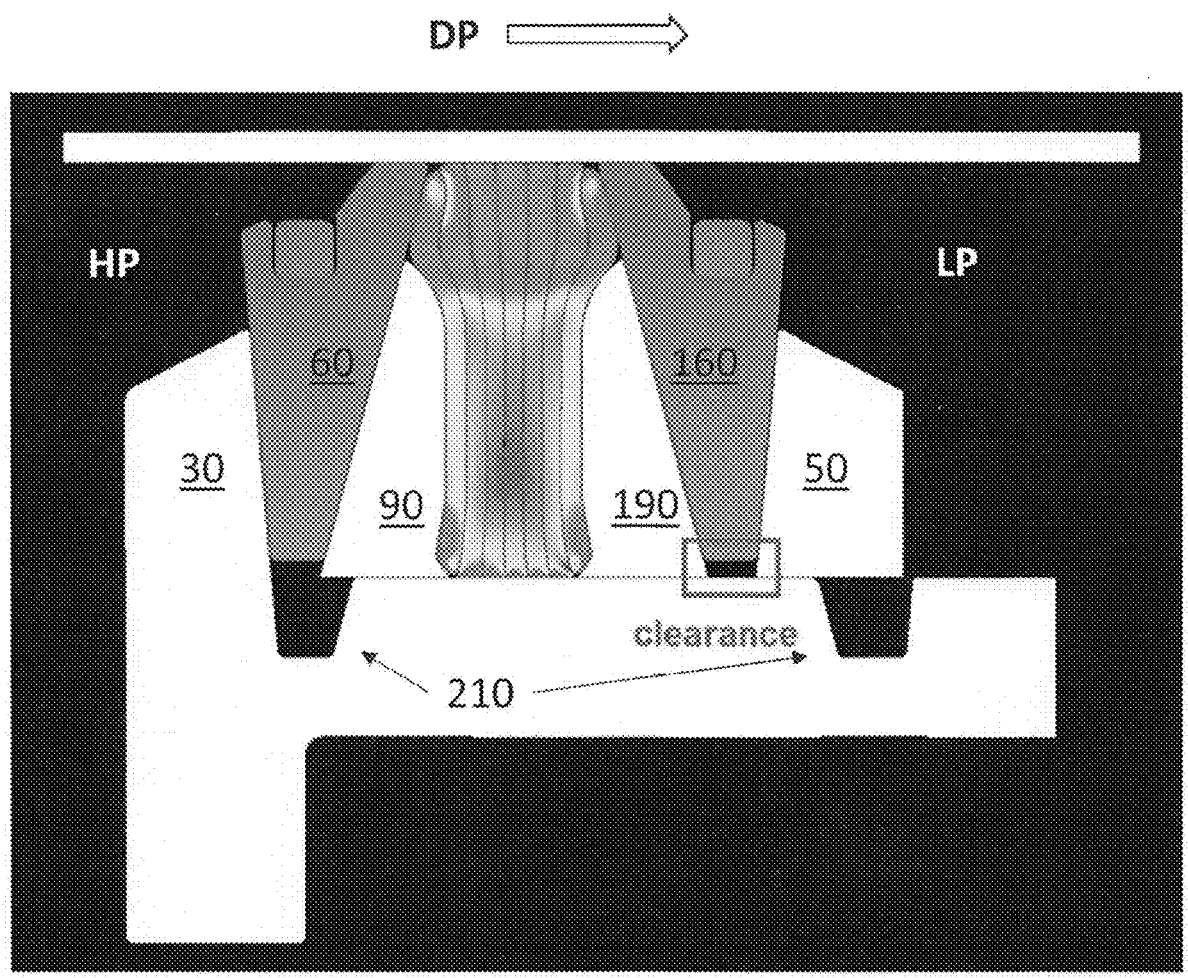
FIG. 13A is Finite Element Analysis results for an embodiment of this disclosure having undercuts set at 12% extrusion gap (2% above the lower bound 10%). For this seal geometry and at this extrusion gap, the forces are transferred from the high pressure ("HP") side to the low pressure ("LP") side via the rubber seal in the middle. In this example, there is a 2% extrusion gap clearance.
Figure 13B:
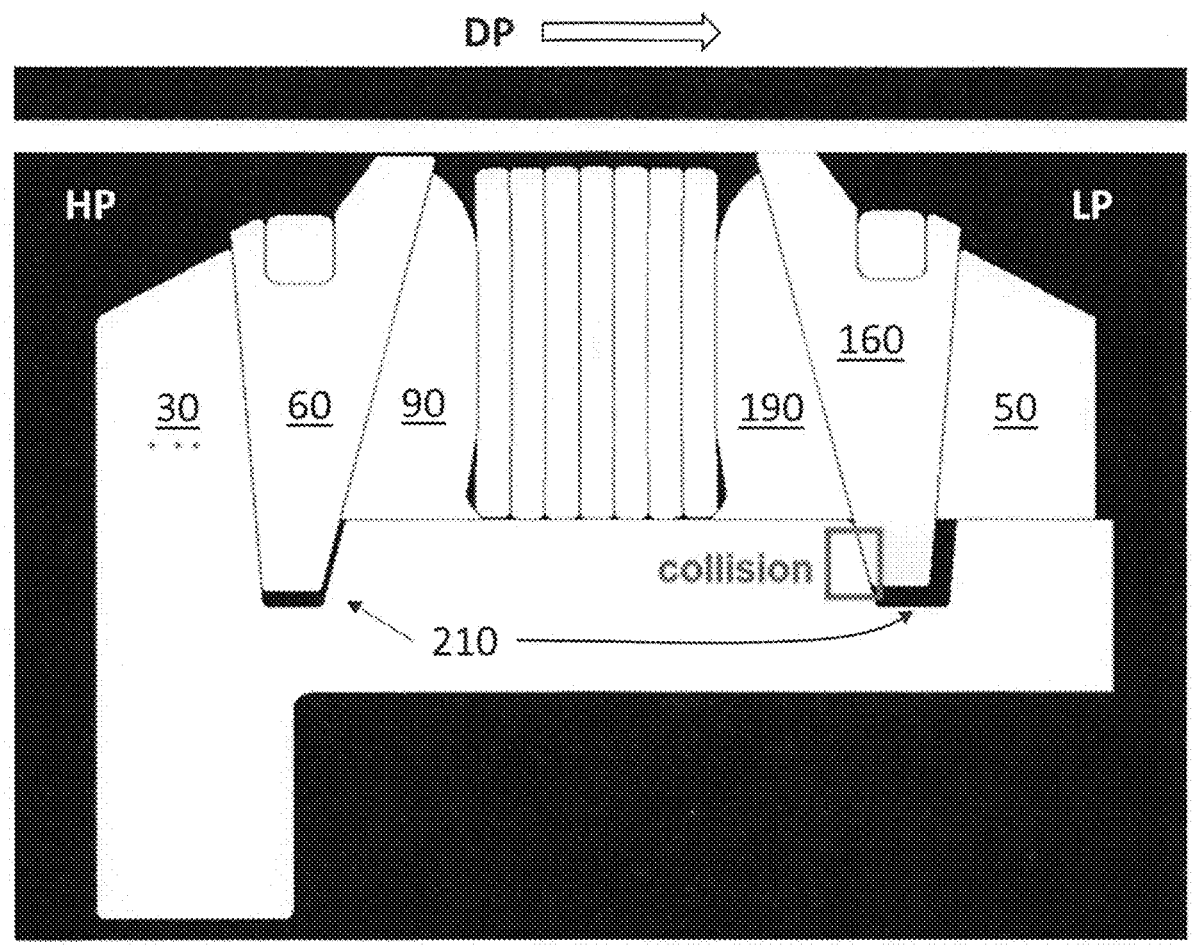
FIG. 13B is an example of the seal of FIG. 13A when operated below a 10% extrusion gap. A collision happens between the LP side structural segment and the pressure head cylinder. If a collision occurs, the forces from the HP side would go through the pressure head component into the opposing component on the LP side while skipping the seal. Therefore, the seal would not get properly energized and would not be able to perform its intended function. The undercut can be sized, like in FIG. 14A, to prevent collision, the size being based in part on the desired extrusion gap range.
Figure 14A:
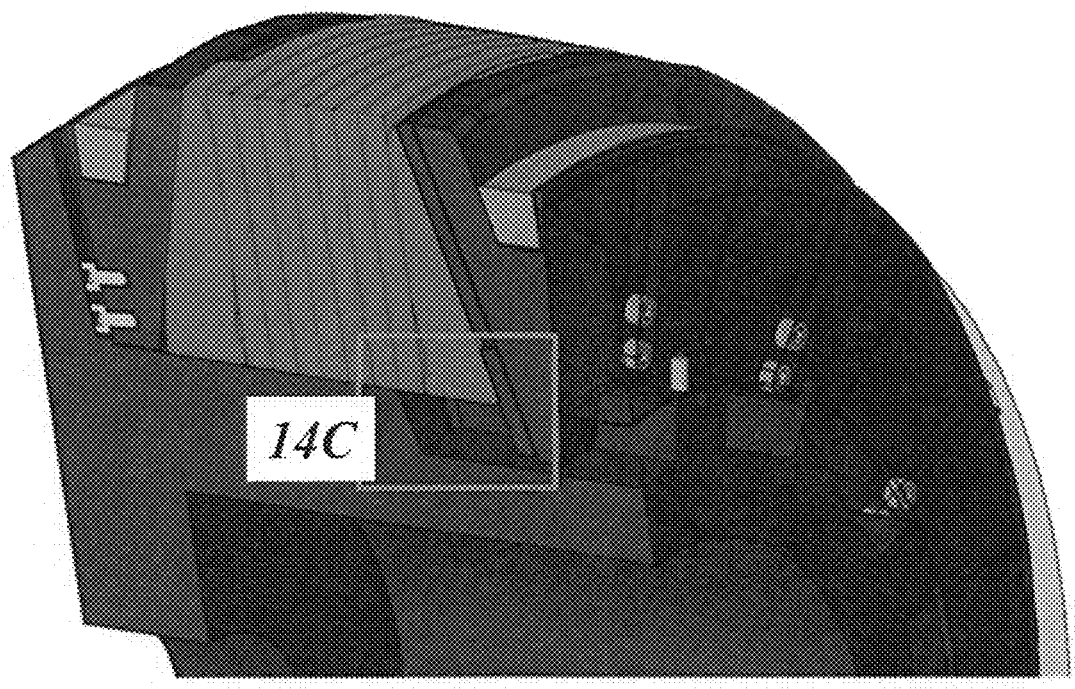
FIG. 14A is an isometric view of an embodiment including a "hybrid undercut" version which could operate between, approximately, a 4% to 20% extrusion gap. As compared to the embodiments of FIGS. 13A and 13B, the extra space provided here in the undercut in the axial direction postpones the collision between structural segments and the pressure head cylinder. Therefore, the extrusion gap range with undercuts can be improved, for example, from 10%-20% to 4%-20%. Regardless of the exact range, the extrusion gap must be large enough so that the seal does not migrate into the openings at the inner diameter.
Figure 14B:
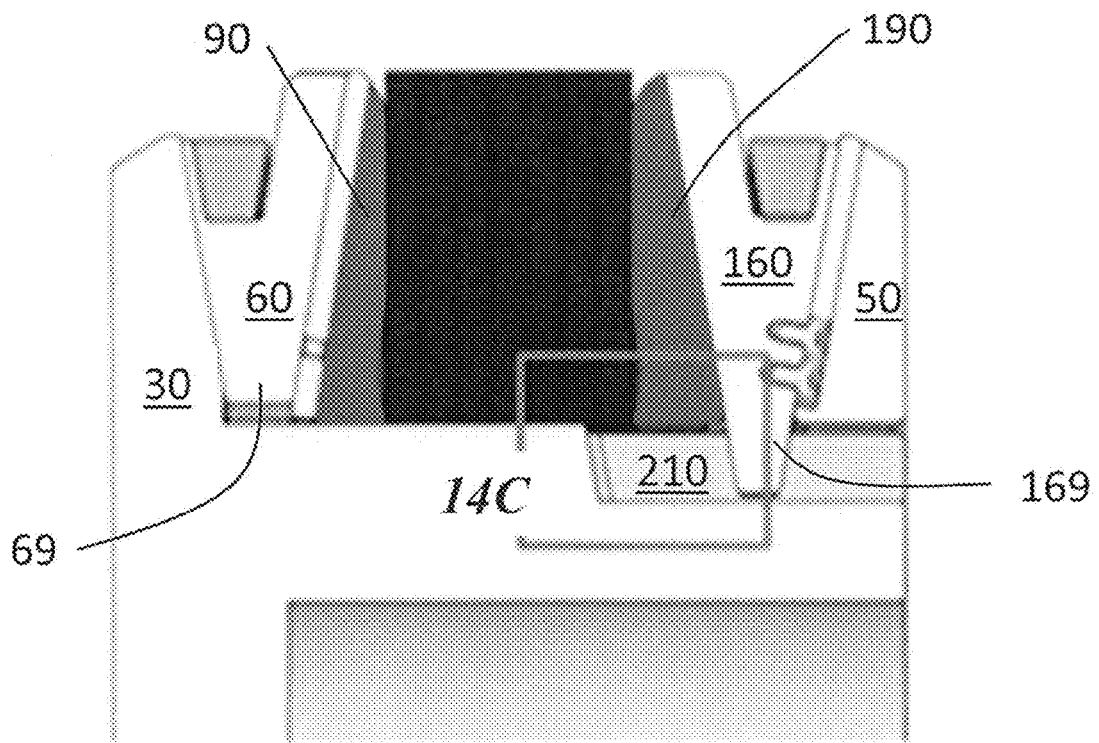
FIG. 14B is a front elevation cross-section view of FIG. 14A.
Figure 14C:
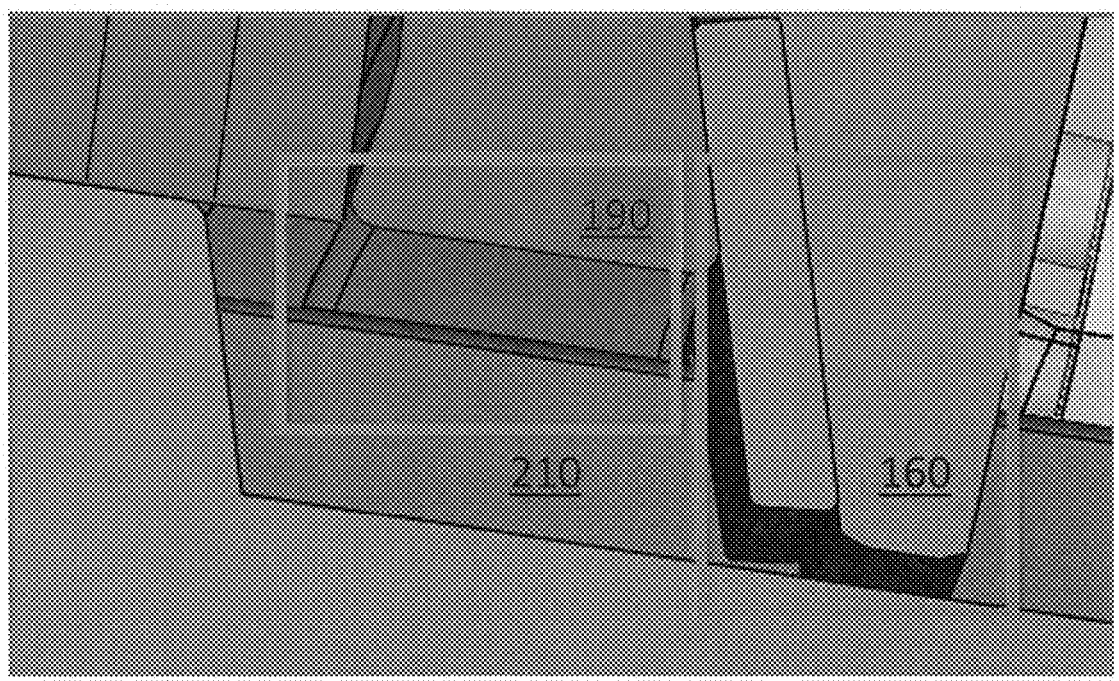
FIG. 14C is an enlarged view of the details included in detail 14C of FIGS. 14A and 14B. A hybrid undercut is provided that provides more space to the undercut in the axial direction. The inner ring can glide or be stabilized on the pressure head cylinder. The LP-side structural segments are deeper than that of the HP side and provide extra strength and stiffness to the assembly.

As the tool 20 is activated to move sealing element 40 into a sealing position within the pipe 10, the support system 60 and its structural segments 68 expand to contact pipe wall 12 before sealing element 40 does (see, e.g., FIG. 10). This helps prevent transition of the sealing element 40 over the support system 60. When sealing element 40 is fully expanded and under differential pressure, the sealing element is restrained from extruding by the structural segments 68 as well as the gap segments 70 and inner ring 90. The structural segments 68 may be linked or bound together to ensure a balanced synchronous expansion. However, in some embodiments, structural segments 68 are not bound together. The thickness of the structural segments 68 and gap segments 70 are tool-dependent. The structural segments 68 may be thicker than the gap segments 70.

Support system 60 further includes a groove 66 on an outside surface 62 (opposite that of the inner ring 90) that receives a spring 80, the grove 66 and spring 80 being circumferential. The spring 80 may be comprised of a suitable metal or steel, polyurethane, nitrile butadiene rubber, hydrogenated nitrile butadiene rubber, or their equivalents. Spring 80 surrounds support system 60 and helps return the support system 60 to a relaxed position when an activation force is removed or when differential pressure over the sealing element 40 is removed.

Figure 7:
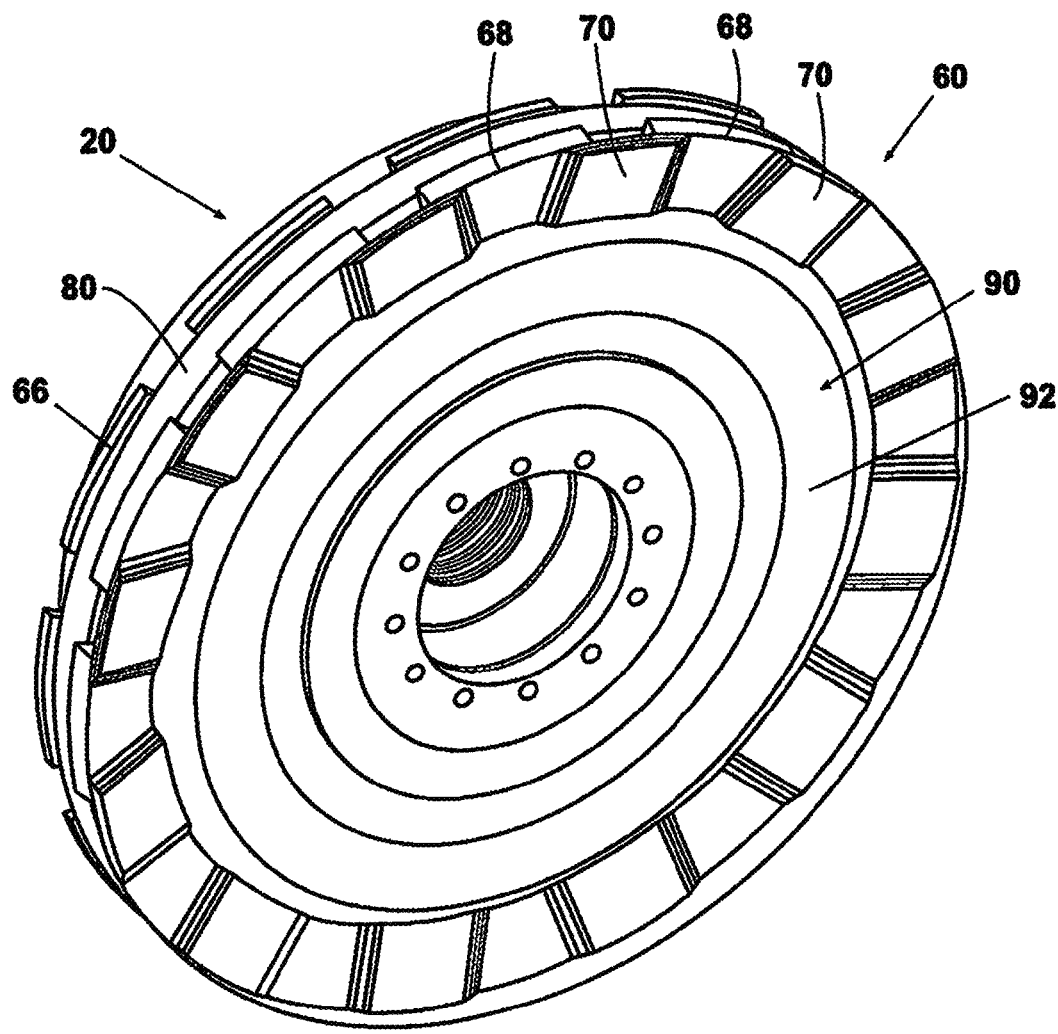
FIG. 7 is a perspective view of a sealing element facing surface of a support system showing the structural segments, gap segments and the inner ring. The inner ring includes a smooth inner guiding surface for engaging the side of the sealing element. The guiding surface is tilted inwardly towards the sealing element for establishing a resistance to the sealing element when the sealing element expands and for preventing the ID of the sealing element from expanding outwardly when compressed.
Figure 8A:
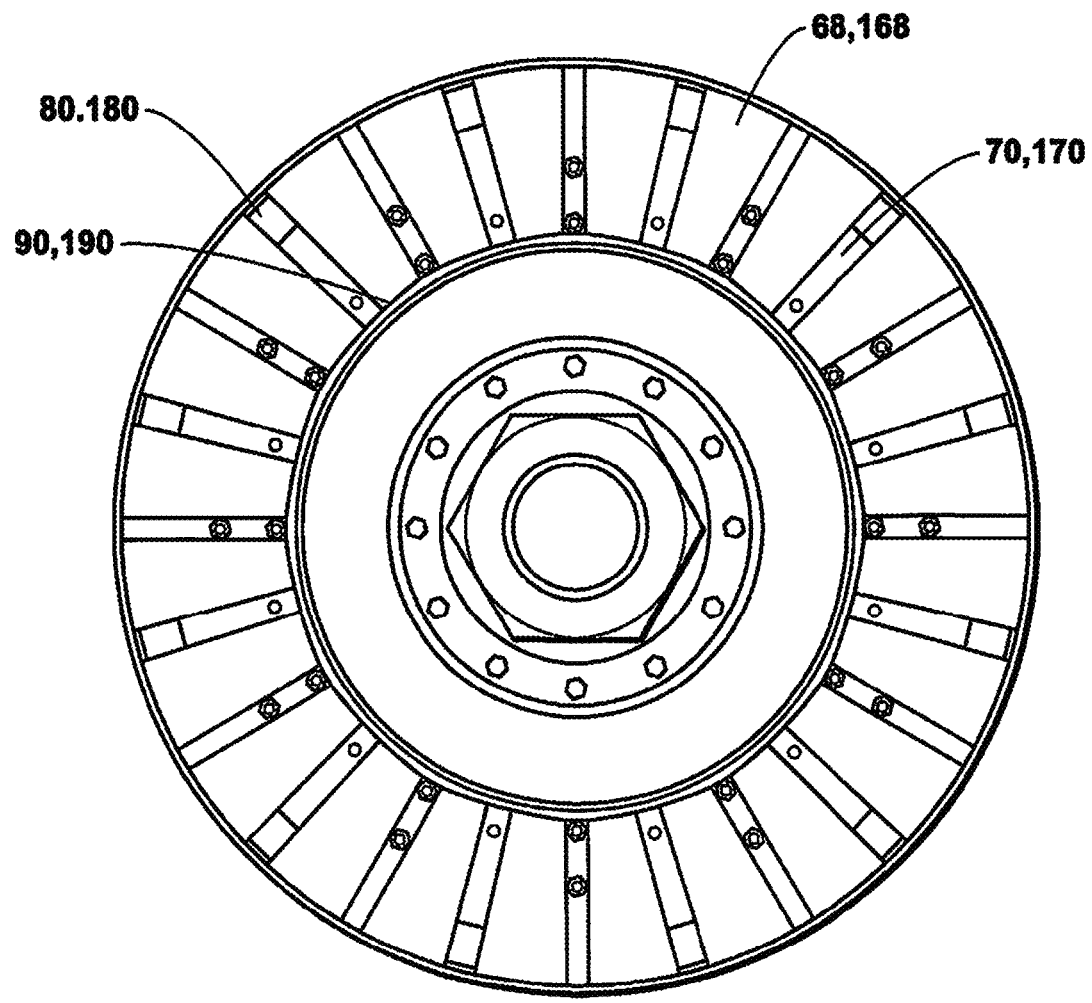
FIG. 8A is an end view of the fenced barrier made up of the inner ring and structural and gap segments when the sealing element is in a relaxed state.
Figure 8B:
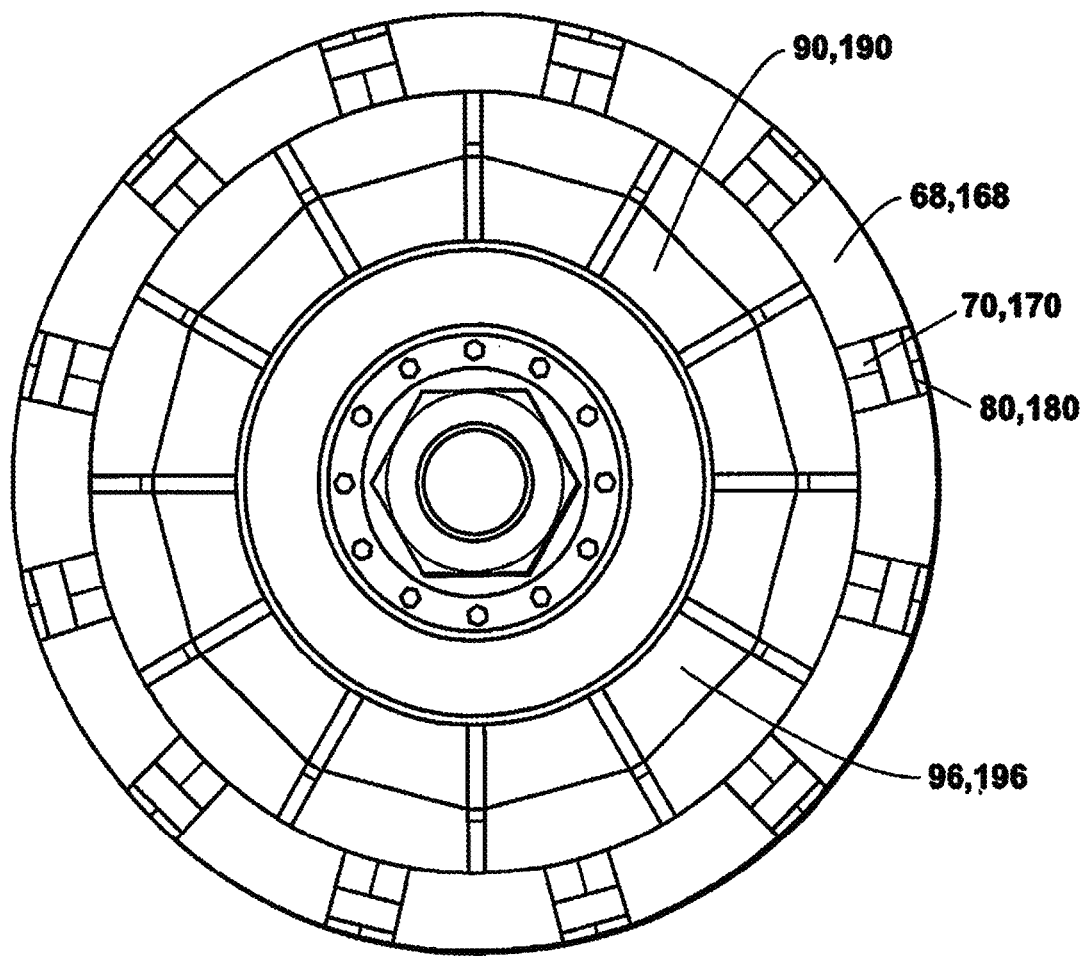
FIG. 8B is an end view of the fenced barrier of FIG. 8A when the sealing element is in an expanded state.

Inner ring 90 is located adjacent to the sealing element facing surface 64 of the support system 60. The ring 90 supports the structural segments 68 when the support system 60 is expanded and defines a guiding surface 92 (see FIG. 7) for engaging an opposing side 42 or 44 of sealing element 40. Guiding surface 92 is tilted inwardly and may be titled at an angle of 1 to 25 degrees, relative to vertical, towards sealing element 40, there being sub-ranges within this broader range as well as discrete values (e.g., without limitation, 1 to 10 degrees, 3 to 7 degrees, or at 5 degree angle; 11 to 25 degrees, 13 to 22 degrees, or at an 18 degree angle). The tilt establishes resistance to the sealing element 40 when the element 40 expands and helps prevent inside diameter 46 of sealing element 40 from expanding outwardly when compressed. As the sealing element 40 expands, more of the outer surface 96 of the ring is exposed as support system 60 moves radially (see e.g., FIGS. 8A & 8B).

Due to the compressive nature of the loading on the seal 40, there is a risk of the seal buckling during activation and, therefore, expanding in a non-uniform fashion which could lead to seal damage or lack of sealing. To mitigate or eliminate this risk, the lower end 98 of the inner ring 90 may include a concave portion 99 opposite a lower end 49 of the seal 40. The concave portion 99 traps or locks the seal 40 in that location and prevents it from expanding radially. The concave portion 99 may be more aggressive or deeper than that shown here but could unnecessarily compromise the strength and stiffness of the inner ring 90. A more benign concave shape helps increase the strength and stiffness of the inner ring 90 while still sufficiently trapping or locking the lower end of the seal 40. An upper end 91 of the inner ring 90 may be convex shaped, the sealing element 40 contacting the convex curve as the element 40 expands.

Figure 9:
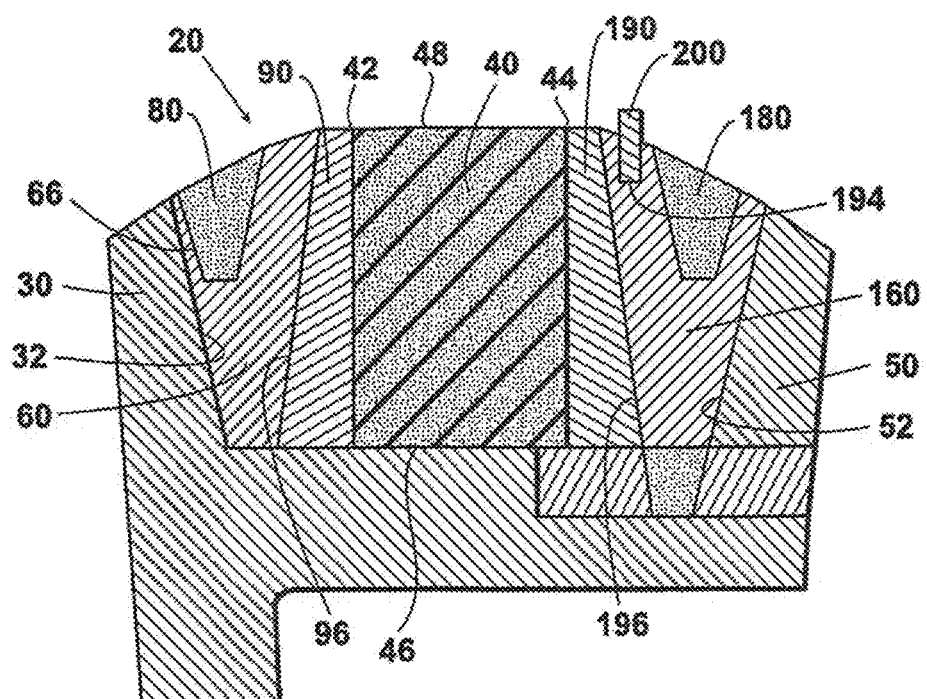
FIG. 9 (showing a protection ring on the support system, which may be the lower pressure side the tool if product flow is from left to right). An undercut may also be added in the activation plates. See e.g.

In embodiments, one or both support systems 60, 160 may include a groove 194 for receiving a protection ring 200 (see, e.g., FIG. 9). The protection ring 200 may be located between a corresponding one of the springs 80, 180 and the inner rings 90, 190 and project radially outward of the spring 80, 180 and inner ring 90, 190. By way of an example, when on support system 160, protection ring 200 further protects sealing element 40 from extending out a gap on the lower pressure side between the pipe wall 12 and the support system 160. Protection ring 200 further allows use of a softer sealing element 40 than do embodiments without the protection ring 200. In embodiments, protection ring 200 has a harder durometer than sealing element 40.

Referring to FIGS. 1, 2, and 13-15, at least one undercut 210 may be provided in one or both of the activation plates 30, 50 in embodiments with or without protection ring 200. In some embodiments, there are two undercuts 210 in plate 30. The undercut 210 limits the setting range of the protection ring 200, e.g., without undercutting 0% to at least 20%; with undercut 10% to at least 20%. The undercut 210 increases the clamp support between inner rings 90, 190 and activation plate 30 or 50 for support system 60, 160. This helps to hold support system 60, 160 better at the higher setting range (e.g., 10% and above). This should not limit the setting/working range of isolation tool 20 or its sealing capacity since the tool 20 can achieve 0%-20% without the undercut design. Therefore, embodiments can be one of four design configurations: (1) undercut and no protection ring; (2) undercut and protection ring; (3) no undercut and protection ring; (4) no undercut and no protection ring.

Thus, embodiments of this disclosure are well adapted to carry out the objectives and advantages mentioned above as well as those inherent therein. While presently embodiments have been described for purposes of this disclosure, numerous changes and modifications will be apparent to those skilled in the art. Such changes and modifications are encompassed within the spirit of this disclosure, the invention being defined by the following claims. Each element recited in the claims is entitled to its full range of equivalents.

The invention claimed is:

1. A pipeline isolation tool (20) adapted for insertion into a pipe, the pipe defining a pipe wall having an ID, the pipeline isolation tool defining a fixed outer diameter (22) and further comprising:

a sealing element (40) having a first side (42), a second side (44), and an outer circumferential side (43) located between the first and second sides, the sealing element having a smaller diameter in a fully relaxed state and a larger diameter in a fully expanded state, the fully expanded state being radially outward of the fixed outer diameter;

a pair of activation plates (30, 50), each plate of the pair located opposite a corresponding one of the first and second sides of the sealing element, at least one activation plate of the pair of activation plates moveable in an axial direction toward the sealing element;

a pair of fenced barriers (60, 160), each fenced barrier located between a corresponding one of the pair of activation plates and the first and second sides of the sealing element and arranged for axial and radial movement between a fully relaxed state and a fully expanded state, the fully expanded state of the fenced barrier being outward of the fixed outer diameter, each fenced barrier including a groove (66, 166), a spring (80, 180) located in the groove, a plurality of structural segments (68, 168), a plurality of gap segments (70), and an inner ring (90, 190);

the structural segments having a wedge shape, a spacing between adjacent structural segments of the plurality of structural segments being smaller when the fenced barrier is in the fully relaxed state and larger when the fenced barrier is in a fully expanded state, each corresponding gap segment of the plurality of gap segments sized to span at least the larger spacing;

the inner ring including a guide surface (92, 192) arranged opposite of, at an oblique angle relative to, and in contact with a corresponding one of the first and second sides of the sealing element;

the inner ring covering one portion of the corresponding one of the first and second sides, the plurality of structural segments covering another portion, and the plurality of gap segments covering yet another portion;

the fenced barrier and the sealing element arranged so that the fully expanded state of the fenced barrier occurs prior to the fully expanded state of the sealing element.

2. The pipeline isolation tool of claim 1, wherein one of the fenced barriers is arranged to move into the fully expanded state prior to another one of the fenced barriers moving into the fully expanded state.

3. The pipeline isolation tool of claim 1, wherein at least one of the fenced barriers includes a protection ring (200) located between the spring and the inner ring and projecting radially outward of the spring and inner ring.

4. The pipeline isolation tool of claim 1, further comprising at least one of the activation plates including at least one undercut (210), a lower end (69, 169) of a corresponding one of the pair of fenced barriers residing in the at least one undercut when the fenced barrier is in the fully relaxed state.

5. The pipeline isolation tool of claim 1, wherein the angle of the guide surface is in a range of 1° to 25° relative to vertical.

6. The pipeline isolation tool of claim 1, wherein the sealing element in the fully expanded state is in a range of 0% to at least 20% greater than the fixed outside diameter of the pipeline isolation tool.

7. The pipeline isolation tool of claim 1, wherein the sealing element includes a plurality of stacked plates (40A) bonded together.

8. The pipeline isolation tool of claim 1, further comprising the sealing element being a dual durometer sealing element, a softer durometer of the dual durometer being toward the outer circumferential side of the sealing element.

9. The pipeline isolation tool of claim 1, wherein the sealing element includes a wrap (45) defining the outer circumferential side.

10. The pipeline isolation tool of claim 9, wherein the wrap includes fibers.

11. A method for preventing seal creep of a sealing element (40) of a pipeline isolation tool (20), the pipeline isolation tool having a fixed outer diameter (22), the sealing element having a first side (42), a second side (44), and an outer circumferential side (43) located between the first and second sides, the sealing element having a smaller diameter in a fully relaxed state and a larger diameter in a fully expanded state, the fully expanded state being radially outward of the fixed outer diameter, the method comprising:

actuating at least one activation plate (30, 50) of a pair of activation plates in an axial direction toward the sealing element, each plate of the pair located opposite a corresponding one of the first and second sides of the sealing element; and in response to the actuating, moving a pair of fenced barriers (60, 160) between a fully relaxed state and a fully expanded state, each fenced barrier located between a corresponding one of the pair of activation plates and the first and second sides of the sealing element and arranged for axial and radial movement between a fully relaxed state and the fully expanded state, the fully expanded state of the fenced barrier being outward of the fixed outer diameter;

wherein each fenced barrier includes a groove (66, 166), a spring (80, 180) located in the groove, a plurality of structural segments (68 168), a plurality of gap segments (70, 170), and an inner ring (90, 190);

wherein the structural segments have a wedge shape, a spacing between adjacent structural segments of the plurality of structural segments being smaller when in the fenced barrier is in the fully relaxed state and a larger when the fenced barrier is in a fully expanded state, each corresponding gap segment of the plurality of gap segments sized to span at least the larger spacing;

wherein the inner ring includes a guide surface (92, 192) arranged opposite of, at an oblique angle relative to, and in contact with a corresponding one of the first and second sides of the sealing element;

wherein the inner ring covers one portion of the corresponding one of the first and second sides, the plurality of structural segments covers another portion, and the plurality of gap segments covers yet another portion; and in response to the moving of the pair of fenced barriers, the sealing element moves between the fully relaxed state and the fully expanded state, the pair of fenced barriers being in their fully expanded state prior to that of the sealing element.

12. The method of claim 11, wherein one of the fenced barriers moves into the fully expanded state prior to another one of the fenced barriers moves into the fully expanded state.

13. The method of claim 11, wherein at least one of the fenced barriers includes a protection ring (200) located between the spring and the inner ring and projecting radially outward of the spring and inner ring.

14. The method of claim 13, wherein at least one of the activation plates includes at least one undercut (210), a lower end (69, 169) of a corresponding one of the pair of fenced barriers residing in the at least one undercut when the fenced barrier is in the fully relaxed state.

15. The method of claim 11, wherein the angle of the guide surface is in a range of 1° to 25° relative to vertical.

16. The method of claim 11, wherein the sealing element in the fully expanded state is in a range of 0% to at least 20% greater than the fixed outside diameter of the pipeline isolation tool.

17. The method of claim 11, wherein the sealing element includes a plurality of stacked plates (40A) bonded together.

18. The method of claim 11, wherein the sealing element is a dual durometer sealing element, a softer durometer of the dual durometer being toward the outer circumferential side of the sealing element.

19. The method of claim 11, wherein the sealing element includes a wrap (45) defining the outer circumferential side.

20. The method of claim 19, wherein the wrap includes fibers.

\* \* \* \* \*